(12) United States Patent
Alstad et al.

(10) Patent No.: US 10,808,399 B2
(45) Date of Patent: Oct. 20, 2020

(54) ENHANCED ACOUSTIC CELL AND ENHANCED ACOUSTIC PANEL, AND METHODS OF PRODUCING THE SAME

(71) Applicant: HONEYWELL INTERNATIONAL INC., Morris Plains, NJ (US)

(72) Inventors: Shawn Alstad, Phoenix, AZ (US); William Schuster, Phoenix, AZ (US); Mark McNair, Gilbert, AZ (US); Donald G Godfrey, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 396 days.

(21) Appl. No.: 15/782,056

(22) Filed: Oct. 12, 2017

(65) Prior Publication Data

US 2019/0112803 A1  Apr. 18, 2019

(51) Int. Cl.

| | | |
|---|---|---|
| *G10K 11/02* | (2006.01) | |
| *G10K 11/04* | (2006.01) | |
| *G10K 11/172* | (2006.01) | |
| *G10K 11/00* | (2006.01) | |
| *G10K 11/16* | (2006.01) | |
| *E04B 1/82* | (2006.01) | |
| *B33Y 80/00* | (2015.01) | |

(Continued)

(52) U.S. Cl.
CPC .......... *E04B 1/8209* (2013.01); *B22F 3/1055* (2013.01); *B33Y 10/00* (2014.12); *B33Y 80/00* (2014.12); *E04B 1/84* (2013.01); *E04B 2/7409* (2013.01); *G10K 11/002* (2013.01); *G10K 11/16* (2013.01); *G10K 11/172* (2013.01); *E04B 2001/8414* (2013.01); *E04B 2001/8428* (2013.01)

(58) Field of Classification Search
CPC . E04B 1/82; E04B 1/8209; E04B 1/84; E04B 2001/8414; E04B 2001/8423; E04B 2001/8428; E04B 2001/748; G10K 11/002; G10K 11/02; G10K 11/04; G10K 11/16; G10K 11/172; B32B 3/12; B64D 2033/0206
See application file for complete search history.

(56) References Cited

U.S. PATENT DOCUMENTS 3,269,484 A  8/1966  Lighter
3,734,234 A * 5/1973  Wirt .......................... E04B 1/86
                                                                       181/286

(Continued)

FOREIGN PATENT DOCUMENTS

CA  2165853 A1  6/1997
FR  2377679 A1 * 8/1978  ............. G10K 11/16

OTHER PUBLICATIONS

European Patent and Trademark Office, European Extended Search Report for Application No. 18199749.5 dated Mar. 15, 2019.

*Primary Examiner* — Edgardo San Martin
(74) *Attorney, Agent, or Firm* — Lorenz & Kopf, LLP (57) ABSTRACT

An enhanced acoustic cell for use in acoustic panels is provided. The provided enhanced acoustic cell has a parabolic-shaped cell floor and a receiving object suspended at its focal point. Components of the enhanced acoustic cell may be easily replicated and installed into a face sheet comprising an array of a plurality of interconnected acoustic cells. The provided acoustic cell, and arrays thereof, may be produced using an additive manufacturing (AM) technology.

20 Claims, 7 Drawing Sheets

(51) Int. Cl.
  *B22F 3/105*    (2006.01)
  *B33Y 10/00*    (2015.01)
  *E04B 1/84*     (2006.01)
  *E04B 2/74*     (2006.01)
  *B32B 3/12*     (2006.01)

(56) References Cited

U.S. PATENT DOCUMENTS

| | | | | |
|---|---|---|---|---|
| 3,895,188 A * | 7/1975 | Ingraham | | G10K 11/08 |
| | | | | 381/160 |
| 3,997,020 A * | 12/1976 | Busnel | | E04B 1/84 |
| | | | | 181/175 |
| 4,094,379 A | 6/1978 | Steinberger | | |
| 4,226,299 A | 10/1980 | Hansen | | |
| 4,667,768 A * | 5/1987 | Wirt | | G10K 11/172 |
| | | | | 181/286 |
| 5,004,070 A * | 4/1991 | Wang | | E04B 1/86 |
| | | | | 181/286 |
| 5,185,504 A * | 2/1993 | Jen | | E04B 1/86 |
| | | | | 181/286 |
| 5,457,291 A * | 10/1995 | Richardson | | B28B 23/0068 |
| | | | | 181/293 |
| 5,491,310 A * | 2/1996 | Jen | | E04B 1/86 |
| | | | | 181/286 |
| 6,457,554 B1 * | 10/2002 | Wang | | E04B 1/84 |
| | | | | 181/198 |
| 7,451,855 B2 * | 11/2008 | Wang | | E04B 1/8209 |
| | | | | 181/198 |
| 8,307,945 B2 * | 11/2012 | Todorovic | | F02K 1/34 |
| | | | | 181/213 |
| 8,408,358 B1 * | 4/2013 | Hermiller | | F02K 1/827 |
| | | | | 181/229 |
| 9,068,345 B2 * | 6/2015 | Ichihashi | | E04B 1/84 |
| 9,330,651 B1 * | 5/2016 | Wang | | G10K 11/172 |
| 10,280,839 B2 * | 5/2019 | Riou | | B32B 7/12 |
| 2014/0027199 A1 | 1/2014 | Claeys et al. | | |
| 2015/0041247 A1 | 2/2015 | Ichihashi | | |
| 2015/0041248 A1 | 2/2015 | Ichihashi | | |
| 2019/0080679 A1 * | 3/2019 | Alstad | | B32B 3/12 |

\* cited by examiner

ENHANCED ACOUSTIC CELL AND ENHANCED ACOUSTIC PANEL, AND METHODS OF PRODUCING THE SAME

TECHNICAL FIELD

The present disclosure generally relates to methods of producing acoustic panels, and more particularly relates to an enhanced acoustic cell and an enhanced acoustic panel based thereon, for use in various acoustic panel applications, and methods of producing the same.

BACKGROUND

In a variety of applications, such as aircraft, aircraft engines, automotive, mining, farming, audio equipment, heating ventilation and air conditioning (HVAC), and the like, pressure waves are generated in a broad range of audible frequencies. The audible frequencies are sound waves experienced as noise. Acoustic treatments employ acoustic panels to dampen the sound waves.

The performance of a given acoustic panel is generally increased by increasing its surface area. However, technological challenges in manufacturing and material forming techniques often limit the amount of surface area available. This often leads to acoustic panel designs that employ only a single degree of freedom (damping sound waves at a single frequency) or a double degree of freedom (damping sound waves at two frequencies).

Accordingly, design improvements to acoustic panels are desirable. It is further desirable to address these technological challenges at a fundamental building block level. It is desirable, therefore, to provide an enhanced acoustic cell for an enhanced acoustic panel, the enhanced acoustic cell being (i) configurable to damp a wide range of audible frequencies, (ii) able to be easily combined and integrated into a variety of enhanced acoustic panel dimensions, and (iii) manufactural using additive manufacturing (AM) techniques. Furthermore, other desirable features and characteristics of the present embodiment will become apparent from the subsequent detailed description and the appended claims, taken in conjunction with the accompanying drawings and this background of the invention.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is a method for creating an enhanced acoustic cell for use in an enhanced acoustic panel. The method comprises: obtaining a plurality of interconnected acoustic cells, each cell of the interconnected acoustic cells arranged to be open on a top side, have continuous walls, and have a closed original cell floor; at an acoustic cell of the plurality of interconnected acoustic cells, creating the enhanced acoustic cell by, altering the original cell floor to create a parabolic-shaped cell floor having a focal point; and suspending a receiving object at the focal point.

Another method for creating an enhanced acoustic panel is provided. The method comprising: obtaining an array of a plurality of interconnected acoustic cells, each cell of the interconnected acoustic cells arranged to be open on a top side of the face sheet, have continuous walls, and have a parabolic-shaped cell floor; and for each acoustic cell of the plurality of acoustic cells, suspending a receiving object at the respective focal point, thereby creating the enhanced acoustic panel.

Still another method for creating an enhanced acoustic panel is provided. The method comprising: obtaining a plurality of interconnected acoustic cells, each acoustic cell of the plurality of interconnected acoustic cells arranged to be open on a top side and have a closed floor; and at each acoustic cell of the plurality of interconnected acoustic cells, altering the cell floor to create a parabolic-shaped cell floor having a focal point within the cell, thereby creating the enhanced acoustic panel.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, brief summary, or the following detailed description.

Additive manufacturing (AM) is referenced herein. AM, sometimes referred to as 3D printing, is a process in which an object is formed via successive layering using feed material, and this layering process advantageously averts many complex tooling steps in many instances. A given AM process may be automated or computer-controlled such that a desired object or article is fabricated on a layer-by-layer basis in accordance with computer-readable "AM design data", defining the shape and dimensions of the object.

The term "AM processes" encompasses 3D printing processes including, but not limited to, stereolithography (SLA), fused filament fabrication (FFF), and laser sintering (e.g., direct metal laser sintering, DMLS) processes. In some additive manufacturing processes, such as DMLS, the feed material used for metallic parts of an object may be a powdered metal. In the powdered feed material process, powdered metal can be applied to a base and melted in desired locations. The powdered feed material may be melted with a laser beam. The melted powder is solidified to form a layer of the desired product. More metal powder is provided and melted in desired locations to form the next layer, and the process proceeds. In other additive manufacturing processes, the source material may be supplied as a powder or in a different form (e.g., as a wire feed, the source material may be metallic or non-metallic, and other types of targeted energy (e.g., laser or electron beams) may be utilized to successively deposit the source material in desired locations on a base or on previous layers to gradually build up a desired shape.

"AM design data," referenced above, can contain any suitable file type and will often contain or consist of one or more Computer Aided Design (CAD) files, which may be generated by a designer utilizing various commercially-available CAD program products. A non-exhaustive list of such commercially-available CAD program products includes TOPSOLID, CATIA, CREO, AUTODESK INVENTOR, SOLIDWORKS, and NX CAD software packages. The term "AM design data," as appearing herein, thus broadly encompasses any computer-readable data or file types, which can be utilized by an AM machine to fabricate AM components in accordance with a predetermined design, regardless of the particular manner in which the data is stored or disseminated.

Figure 2:
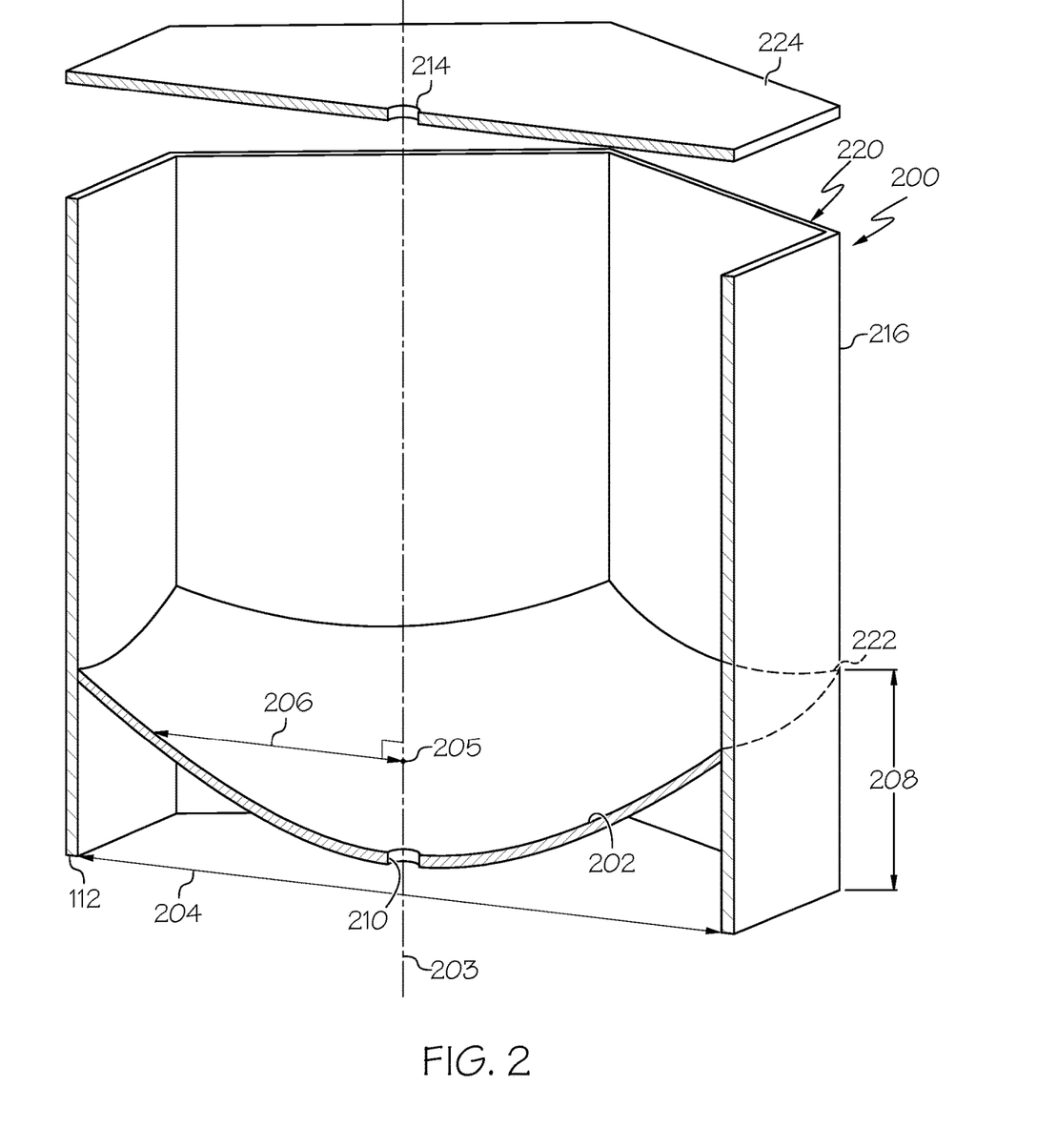
FIG. 2 is a diagram depicting a cross section of a single acoustic cell with a parabolic-shaped cell floor, in accordance with an embodiment.

As an overview, an enhanced acoustic cell (FIG. 2, 200) and enhanced acoustic panels (FIG. 7, 700) based thereon, are introduced herein. The enhanced acoustic cell has a modified or altered cell floor that is shaped as a parabolic dish. As is known from geometric principles, a parabola has a focal point (FIG. 2, 205) within the curvature of the parabola. A line drawn within the parabola that is perpendicular to its directrix is reflected off of the parabola and into the focal point 205. In three dimensions, the provided enhanced acoustic cell 200 comprises a parabolic-shaped cell floor (FIG. 2, 202). In operation, sound pressure entering the enhanced acoustic cell 200, in the form of sound waves, is reflected by the curvature of the parabolic-shaped cell floor 202, and toward the focal point 205. At the focal point 205, received sound waves converge and combine. The received sound waves may comprise a combination of frequencies associated with a given application. A receiving object 302 (see FIG. 3), collocated at the focal point 205, diffuses the received and combined sound waves. Arrays of the provided enhanced acoustic cell 200 may be used to create acoustic panels for acoustic treatment in applications, such as aircraft, aircraft engines, automotive, mining, farming, audio equipment, heating ventilation and air conditioning (HVAC), and the like.

Figure 1:
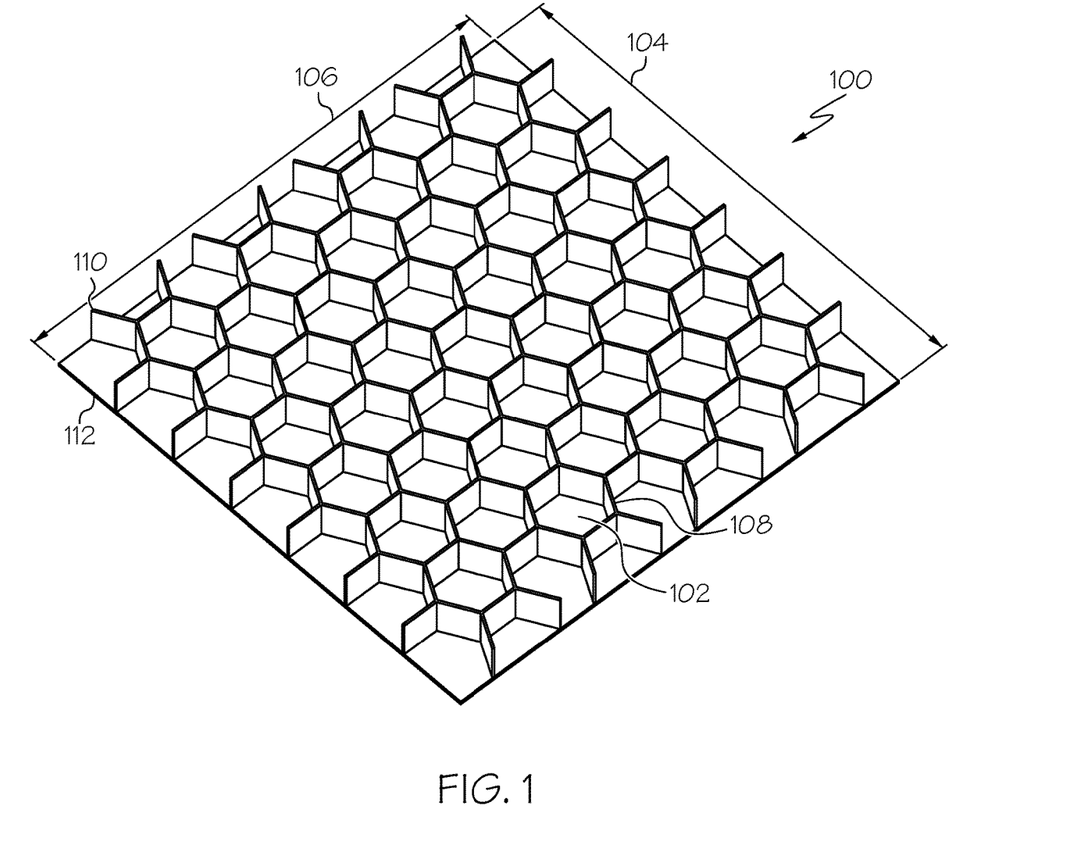
FIG. 1 is a top down view of an acoustic panel, in accordance with various embodiments.

Turning now to FIG. 1, an acoustic panel 100 is shown. As a starter material to be used to create an enhanced acoustic panel (FIG. 7, 700), acoustic panel 100 has an acoustic panel top side 110 and acoustic panel back side 112. Acoustic panel 100 comprises a plurality of equally dimensioned acoustic cells 102 having continuous walls (FIG. 2, 216) providing a regular cross section perpendicular to a central axis 203, organized such that a first dimension 104 has a plurality of rows of the acoustic cells 102, and a second dimension 106 has a plurality of columns of the acoustic cells 102. Note that, when arrayed to form an acoustic panel, each acoustic cell 102 in a plurality of acoustic cells 102 comprising the acoustic panel will have its top side (FIG. 2 220) on an acoustic panel top side 110, and its original cell floor (FIG. 2 222) on an acoustic panel back side 112. When arrayed, acoustic cell 102 has at least some shared boundaries with neighboring acoustic cells 102, such as shared wall 108. In some embodiments, instead of original cell floor 222, the acoustic panel 100 comprises a plurality of interconnected acoustic cells 102 that each have a parabolic-shaped cell floor 202, described in more detail below.

Using a hexagonal shape (i.e., hexagonal cross sectional area) for the acoustic cells 102, as shown in FIG. 1, maximizes a percentage of shared walls 108. Depending on the cross sectional area of the acoustic cell 102, acoustic cells that are internal to the acoustic panel 100 may have the characteristic that all boundary walls are shared walls. In other embodiments, the acoustic cells 102 making up the acoustic panel 100 array may have other cross sectional shapes, such as circular or rectangular. As is readily appreciated, utilizing different acoustic cell shapes may result in variations in array organization and percentages of shared walls to unshared walls.

In FIG. 2, an enhanced acoustic cell 200 with a hexagonal cross section is depicted. An acoustic cell inscribed diameter 204 is noted, measured perpendicular to a central axis 203. Enhanced acoustic cell 200 is open on top side 220 during the initial fabrication process and closed on original cell floor 222. The original cell floor 222, being substantially flat and perpendicular to the continuous enhanced acoustic cell walls 216, may be a distance 208 above the acoustic panel bottom 112. In various embodiments of the enhanced acoustic cell 200, the original cell floor 222 has been altered to become a parabolic-shaped cell floor 202. A parabola defining the parabolic-shaped cell floor 202 may be defined with a directrix, a focal point 205, and a latus rectum (LR) 206. Half of the inscribed diameter 204 serves as the directrix. At some point after the parabolic-shaped cell floor 202 has been formed, an enhanced acoustic cell ceiling 224 may be added using processes such as adhesion, brazing, or other traditional attachment methods known in the industry. An opening 214 allows the sound waves to enter and exit the enhanced acoustic cell 200 through the enhanced acoustic cell ceiling 224.

In some embodiments, the original cell floor 222 and acoustic panel bottom 112 may not be the same; in those embodiments a space between the original cell floor 222 and acoustic panel bottom 112 may be filled with a support material. The support material may be chosen to increase stiffness of an enhanced acoustic panel (FIG. 7, 700), and may enable a process, such as punching, molding, or other, that alters the original cell floor 222 into the parabolic-shaped cell floor 202. In other embodiments, an integrated unit may be created via an AM process, the integrated unit comprising the parabolic-shaped cell floor 202, a receiving object 302, and a means for suspension, as is described in more detail below. The integrated unit may then be installed within an acoustic cell 102 to thereby create an enhanced acoustic cell 200.

FIGS. 3-6 illustrate various embodiments of an acoustic cell 102 in which a receiving object 302 is suspended at the focal point 205 of a parabolic-shaped cell floor 202. A means for suspending the receiving object 302 at the focal point 205 is employed. Although each of the embodiments shown in FIG. 3-6 employ a tower structure 304 as the means for suspending the receiving object 302 at the focal point 205, various other radial supports and/or spring structures may be employed as the means for suspension. In various embodiments, the means for suspension of the receiving object 302 may be attached to the receiving object 302 on a first end and to the enhanced acoustic cell 200 on a second end.

Figure 3:
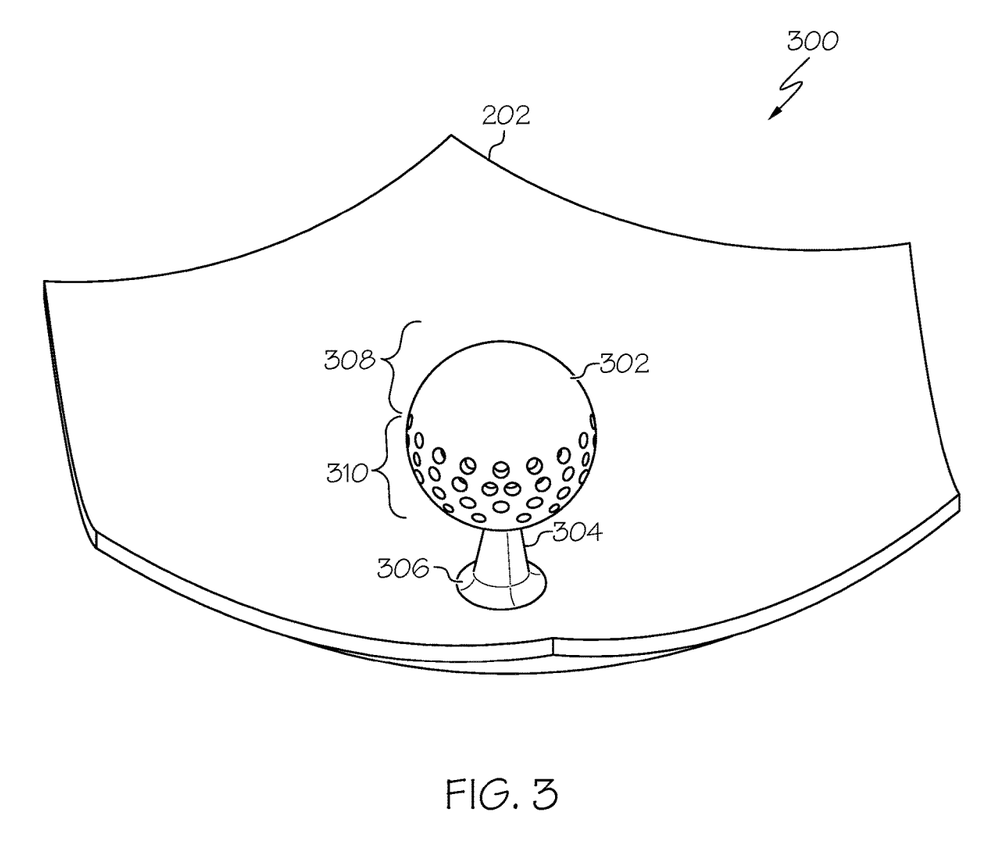
FIG. 3 is a diagram depicting a parabolic-shaped cell floor having a receiving object suspended at the focal point, in accordance with another embodiment.
Figure 4:
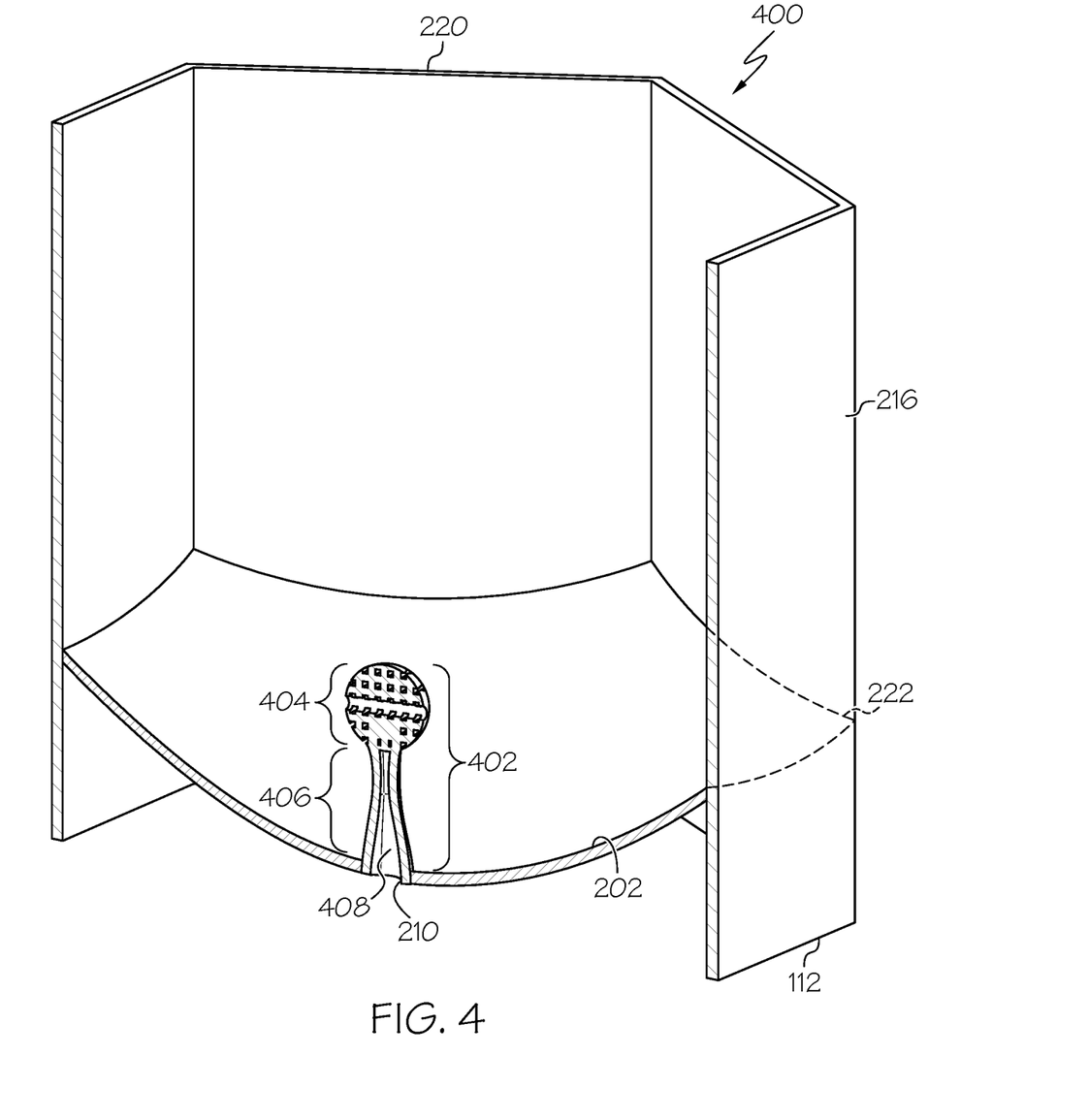
FIG. 4 is a diagram depicting a partial cross section of an acoustic cell with a parabolic-shaped cell floor, showing a receiving object-tower structure in accordance with an embodiment.
Figure 5:
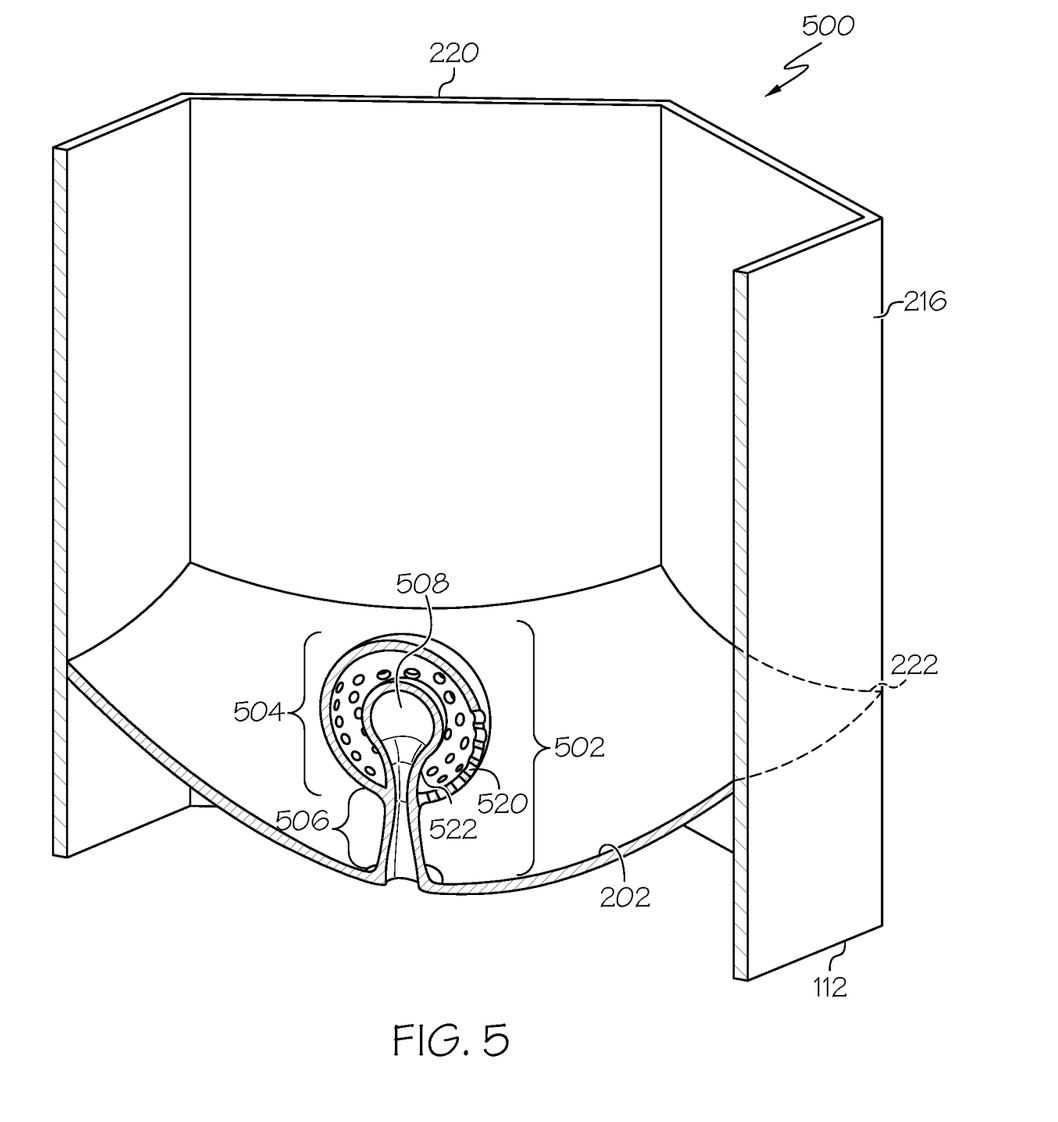
FIG. 5 is a diagram depicting a partial cross section of an acoustic cell with a parabolic-shaped cell floor, showing a receiving object-tower structure in accordance with a another embodiment.

In response to the sound waves received in the interior of the acoustic cell 102 and reflected off of the parabolic-shaped cell floor 202, the receiving object 302 vibrates on the tower structure 304, converting the sound waves into mechanical heat in the acoustic cell 102. The conversion of the sound waves into mechanical heat decreases the sound pressure within the cell structure, and dampens the sound waves. The tower structure 304 may be manufactured to have a predetermined deflection strength that is a function of the anticipated sound waves for a given application. Using AM to manufacture the tower structure 304 enables a flexible design configurability of the deflection strength that may be difficult to achieve with other manufacturing methods. In various embodiments, the receiving object is a sphere with approximately a 0.125 inch sphere diameter, and the tower structure is approximately 0.250 inches tall. The means for suspension (such as tower structures 304, 406, and 506) of a given receiving object are tunable to a predetermined, application-specific cell frequency that it is desirable to dampen.

In FIGS. 3-5 exemplary embodiments of the receiving objects (FIG. 3, 302; FIG. 4, 404; and FIG. 5, 504) are substantially spherical. In the depicted embodiments, the tower structure (FIG. 3, 304; FIG. 4, 406; and FIG. 5, 506) is attached to the enhanced acoustic cell 200, extending from an inner surface of the parabolic-shaped cell floor 202 to provide support for the receiving objects (FIG. 3, 302; FIG. 4, 404; and FIG. 5, 504), and to position them, centered, on the focal point 205. A means for attaching, such as a collar, bracket 306, or an adhesive, may be employed to attach the tower structure to the parabolic-shaped cell floor 202. The location on the parabolic-shaped cell floor 202 to which the tower structure is attached may comprise an opening 210, and in various embodiments, the tower structure and receiving object may be hollowed out, creating a chamber therein (FIG. 4, 408, FIG. 5, 508). Although the depicted embodiments show the second end of the means for suspension attached centrally in the parabolic shaped cell floor 202, in various embodiments, it may be attached to the continuous wall 216 or the enhanced acoustic cell ceiling 224.

The receiving object 302 may comprise a top dome 308 and a bottom dome 310. In various embodiments, the top dome 308 is solid and the bottom dome 310 comprises a plurality of openings. In other embodiments, the receiving object 404 may comprise a plurality of through-holes or openings that are distributed throughout. In still other embodiments, the receiving object 504 may comprise an inner spherical shape 522 enclosed within an outer spherical shape 520, with a hollow space between them. In addition, features of the designs shown in FIGS. 3-5 may be mixed and matched to create an enhanced acoustic panel (FIG. 7, 700) that meets an application's needs.

Figure 6:
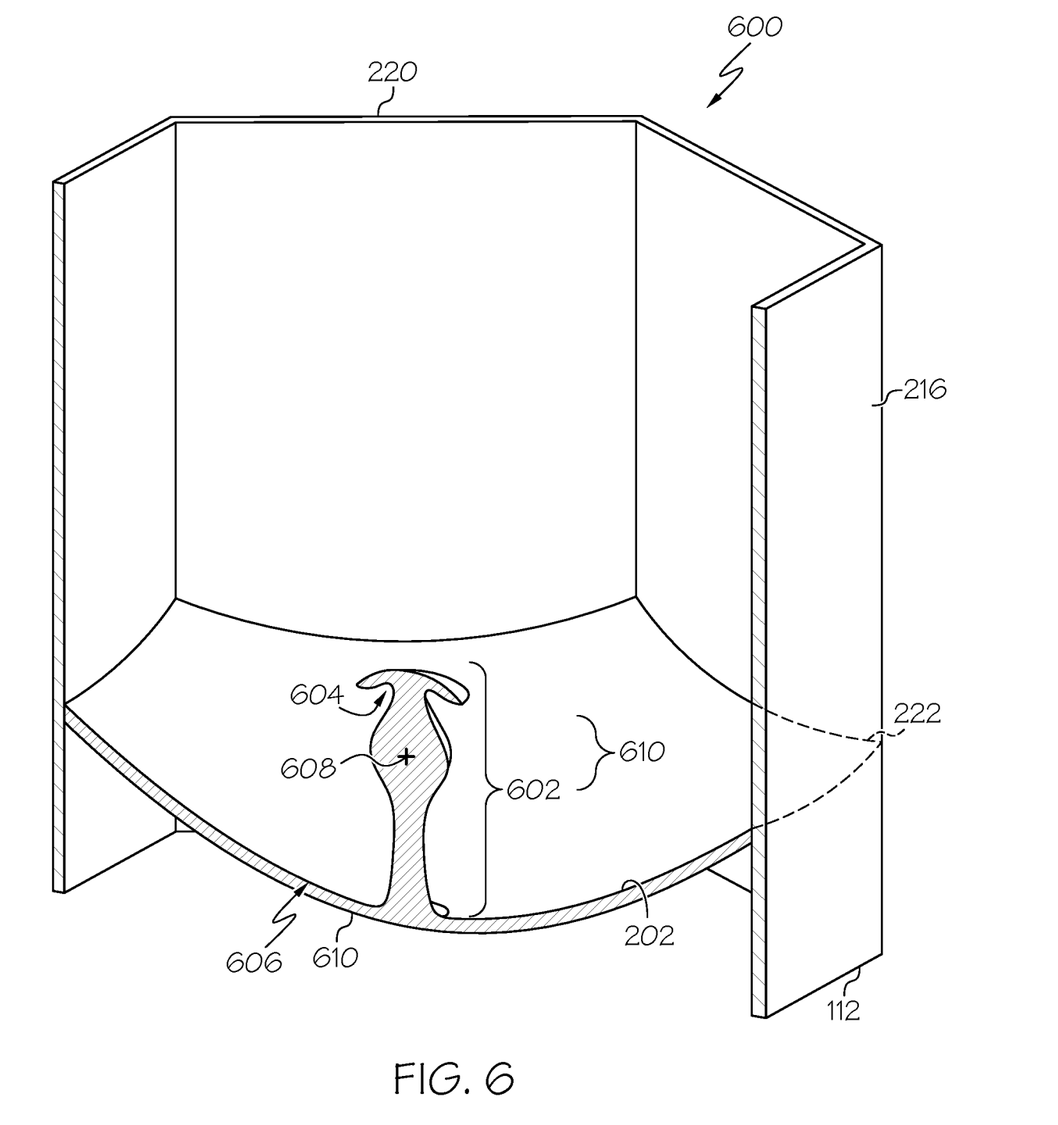
FIG. 6 is a diagram depicting a partial cross section of an acoustic cell with a parabolic-shaped cell floor, showing a receiving object-tower structure in accordance with an additional embodiment.

With reference to FIG. 6, an embodiment in which the receiving object 610 is not substantially spherical is depicted. The parabolic-shaped cell floor 202 (with parabolic shape 1) has extended therefrom a combined piece 602. The combined piece 602 has a receiving object 610 centered on the focal point 608, and has a cap 604 comprising a parabolic shape 2.

Figure 7:
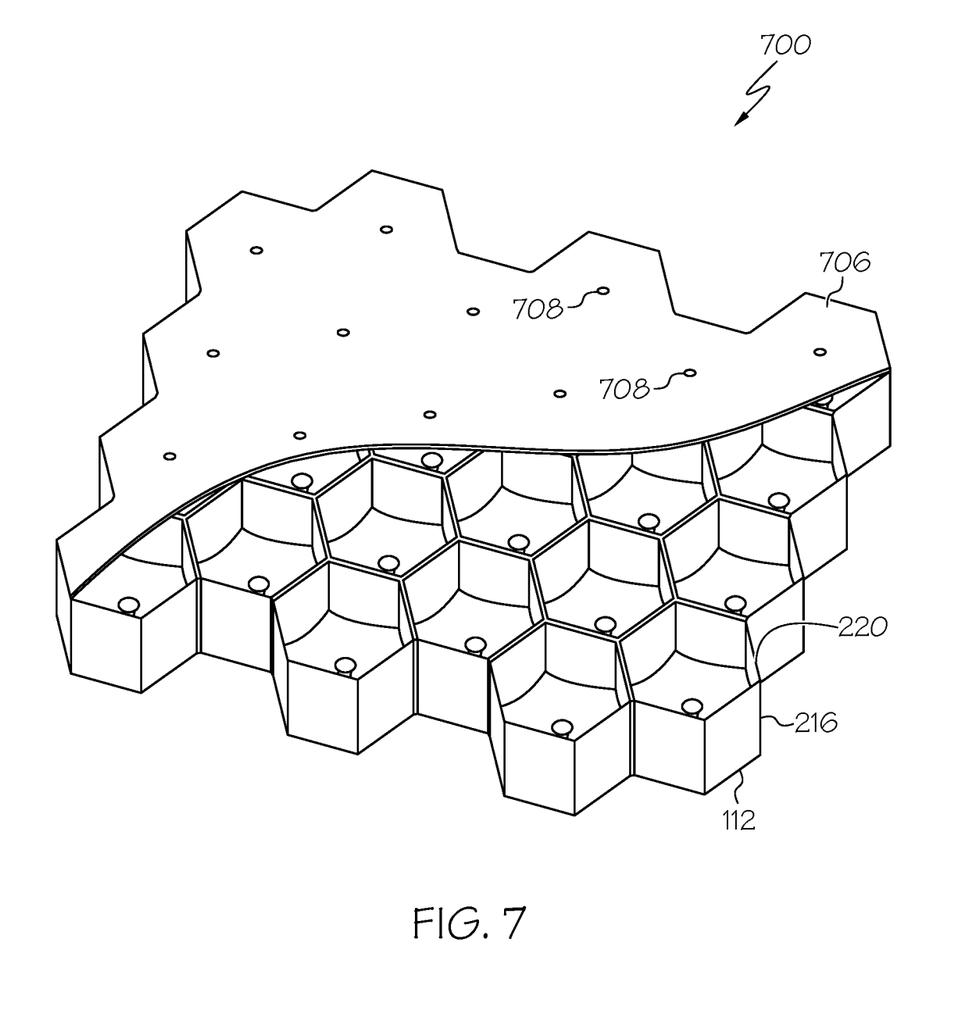
FIG. 7 is a top down view of an enhanced acoustic panel, in accordance with various embodiments.

FIG. 7 depicts an enhanced acoustic panel 700 comprising an array of a plurality of enhanced acoustic cells 200. A face sheet 706 comprises an integration of enhanced acoustic cell ceilings 224. The face sheet 706 comprises a plurality of openings 708 that are substantially centered over a respective enhanced acoustic cell 200.

In some embodiments, the cell frequency of each enhanced acoustic cell of the plurality of enhanced acoustic cells is substantially the same. However, in some applications, it is desirable to dampen multiple, predetermined, specific, frequencies. Recall, the means for suspension (such as tower structures 304, 406, and 506) of a given receiving object are tunable to a predetermined, application-specific cell frequency that it is desirable to dampen. Therefore, in embodiments addressing a need to dampen multiple, predetermined, specific, frequencies, an enhanced acoustic panel 700 may be created in which the means for suspension of each enhanced acoustic cell 200 in the array of the plurality of enhanced acoustic cells 200 is tuned to a cell frequency that is a different one of the multiple, predetermined, specific, frequencies. As may be understood, fabricating an enhanced acoustic panel 700 from a plurality of integrated enhanced acoustic cells 200, each tuned to a different cell frequency, enables each respective tower structure and receiving object to resonate at the designated cell frequency, thereby collectively absorbing sound across a broad range of frequencies.

As may be appreciated, generation of an entire enhanced acoustic panel 700 via AM can be cumbersome and price inefficient. In contrast, separately machining and installing a plurality of receiving objects 302 and tower structures 304 into an acoustic panel 100 may present assembly and quality assurance issues. Accordingly, selective employment of AM, as described below, to a subset of the components of an enhanced acoustic panel is a desirable approach.

In the provided embodiments, the receiving object and the means for suspending the receiving object may be one integrated component. For example, the receiving object 404 and the tower structure 406 may be integrated into combined piece 402; and, the receiving object 504 and the tower structure 506 may be integrated into combined piece 502. In various embodiments, the receiving object 302 and the means for suspending the receiving object are manufactured by an AM process, such as DMLS. In still other embodiments, the receiving object 302, tower structure 304, and the parabolic-shaped cell floor 202 are integrated into one component and manufactured by an AM process, such as DMLS.

In summary, various combinations of the receiving object 302, tower structure 304, and parabolic-shaped cell floor 202 may be (i) integrated, (ii) easily manufactured in an additive manufacturing process, (iii) easily replicated, and (iv) installed into an array comprising a plurality of interconnected acoustic cells 102, thereby creating an enhanced acoustic panel 700. The resulting enhanced acoustic panel 700 provides a lowered noise level than may be achieved by common acoustic panels.

Thus, a novel enhanced acoustic cell 200 for use to make enhanced acoustic panels 700 is provided. The provided enhanced acoustic cell 200 has components that may be easily replicated and installed into an acoustic panel 100 comprising an array of a plurality of interconnected acoustic cells. Various components of the enhanced acoustic cell 200, and arrays thereof, may be produced using an additive manufacturing technology. As is readily appreciated, the above examples are non-limiting, and many other embodiments may meet the functionality described herein while not exceeding the scope of the disclosure.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one embodiment has been presented in the foregoing detailed description of the invention, it should be appreciated that a vast number of variations exist. It should also be appreciated that the embodiment or embodiments are only examples, and are not intended to limit the scope, applicability, or configuration of the invention in any way. Rather, the foregoing detailed description will provide those skilled in the art with a convenient road map for implementing an embodiment of the invention, it being understood that various changes may be made in the function and arrangement of elements described without departing from the scope as set forth in the appended claims and their legal equivalents.

What is claimed is:

1. A method for creating an enhanced acoustic cell for use in an enhanced acoustic panel, the method comprising:
    obtaining a plurality of interconnected acoustic cells, each cell of the interconnected acoustic cells arranged to be open on a top side, have continuous walls, and have a closed original cell floor;
    at an acoustic cell of the plurality of interconnected acoustic cells, creating the enhanced acoustic cell by,
        altering the original cell floor to create a parabolic-shaped cell floor having a focal point; and
        suspending a spherical receiving object at the focal point.

2. The method of claim 1, wherein the spherical receiving object has a diameter, and wherein suspending the receiving object comprises attaching a tower structure with a height approximately twice the diameter to the receiving object on a first end and to the enhanced acoustic cell on a second end.

3. The method of claim 2, wherein the spherical receiving object is fabricated using Direct Metal Laser Sintering (DMLS).

4. The method of claim 3, wherein the tower structure is fabricated using Direct Metal Laser Sintering (DMLS).

5. The method of claim 1, wherein the spherical receiving object comprises a top dome and a bottom dome.

6. The method of claim 5, wherein a tunability of the enhanced acoustic cell is based on a deflection strength of the tower structure.

7. The method of claim 5, wherein the top dome of the spherical receiving object is solid and the bottom dome of the spherical receiving object comprises a plurality of openings.

8. The method of claim 1, wherein each cell of the plurality of interconnected acoustic cells has matching dimensions, and further comprising,
    at each cell of the plurality of interconnected acoustic cells,
        altering the cell floor to create the parabolic-shaped cell floor having a focal point; and
        suspending a spherical receiving object at the respective focal point, thereby creating an enhanced acoustic panel.

9. The method of claim 8, wherein all spherical receiving objects comprise the same dimensions.

10. The method of claim 9, wherein suspending the spherical receiving object comprises attaching the spherical receiving object to a tower structure having a predetermined deflection strength.

11. The method of claim 10, wherein a tunability of the enhanced acoustic panel is based on the predetermined deflection strength.

12. A method for creating an enhanced acoustic panel, the method comprising:
    obtaining an array of a plurality of interconnected acoustic cells, each cell of the interconnected acoustic cells arranged to be open on a top side of the face sheet, have continuous walls, and have a parabolic-shaped cell floor; and
    for each acoustic cell of the plurality of acoustic cells, suspending a spherical receiving object at the respective focal point, thereby creating the enhanced acoustic panel.

13. The method of claim 12, wherein, for each acoustic cell of the plurality of acoustic cells, suspending the spherical receiving object comprises utilizing a tower structure having a height that is twice a diameter of the spherical receiving object attached to the spherical receiving object on a first end and to the acoustic cell on a second end.

14. The method of claim 13, wherein the spherical receiving objects are fabricated using additive manufacturing (AM).

15. The method of claim 14, wherein the tower structures are fabricated using AM.

16. The method of claim 12, wherein the spherical receiving objects are hollow, comprising a top dome and a bottom dome, and are attached to the continuous wall or an enhanced acoustic cell ceiling.

17. The method of claim 15, wherein a tunability of the enhanced acoustic panel is based on a deflection strength of the tower structures.

18. The method of claim 16, wherein the top dome of each spherical receiving object is solid and the bottom dome of each spherical receiving object comprises a plurality of openings.

19. A method for creating an enhanced acoustic panel, the method comprising:
    obtaining a plurality of interconnected acoustic cells, each acoustic cell of the plurality of interconnected acoustic cells arranged to be open on a top side and have a closed floor; and
    at each acoustic cell of the plurality of interconnected acoustic cells,
        altering the cell floor to create a parabolic-shaped cell floor having a focal point within the cell, and suspending a receiving object at the respective focal point thereby creating the enhanced acoustic panel, the receiving object having an inner spherical shape enclosed by an outer spherical shape.

20. The method of claim 19, further comprising, for each acoustic cell of the plurality of acoustic cells, suspending the receiving object at the respective focal point using a hollowed out tower structure with a predetermined deflection strength and a height that is twice a diameter of the receiving object.

* * * * *